(12) United States Patent
Ueki et al.

(10) Patent No.: US 9,196,932 B2
(45) Date of Patent: Nov. 24, 2015

(54) ASSEMBLED BATTERY AND ASSEMBLED BATTERY CONTROL SYSTEM

(75) Inventors: Tomoyoshi Ueki, Toyota (JP); Koji Kawamoto, Aichi-ken (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 343 days.

(21) Appl. No.: 13/060,714

(22) PCT Filed: Aug. 6, 2009

(86) PCT No.: PCT/JP2009/063937
§ 371 (c)(1),
(2), (4) Date: Feb. 25, 2011

(87) PCT Pub. No.: WO2010/024100
PCT Pub. Date: Mar. 4, 2010

(65) Prior Publication Data
US 2011/0175573 A1    Jul. 21, 2011

(30) Foreign Application Priority Data

Aug. 28, 2008  (JP) .................................. 2008-219452

(51) Int. Cl.
*H02J 7/00* (2006.01)
*H01M 10/44* (2006.01)

(52) U.S. Cl.
CPC ..................................... *H01M 10/44* (2013.01)

(58) Field of Classification Search
USPC ........................ 320/116, 119, 122, 124, 126
See application file for complete search history.

(56) References Cited

U.S. PATENT DOCUMENTS

| 4,439,721 | A | * | 3/1984 | Mura ............................... 322/31 |
| 4,652,964 | A | * | 3/1987 | Ziegenbein ..................... 361/54 |
| 4,719,401 | A | * | 1/1988 | Altmejd ......................... 320/122 |
| 5,821,733 | A | * | 10/1998 | Turnbull ....................... 320/116 |
| 6,160,375 | A | * | 12/2000 | Horie et al. .................... 320/116 |
| 6,400,124 | B1 | * | 6/2002 | Hidaka et al. ................. 320/145 |
| 2003/0151389 | A1 | * | 8/2003 | Cummings ................... 320/122 |
| 2004/0038123 | A1 | * | 2/2004 | Hisamitsu et al. ............ 429/147 |
| 2006/0091857 | A1 | * | 5/2006 | Nakanishi et al. ............ 320/116 |

(Continued)

FOREIGN PATENT DOCUMENTS

| JP | 57-193934 | 11/1982 |
| JP | 62-221826 | 9/1987 |

(Continued)

OTHER PUBLICATIONS

International Search Report in International Application No. PCT/JP2009/063937; Mailing Date: Oct. 27, 2009.

*Primary Examiner* — Drew A Dunn
*Assistant Examiner* — Steve T Chung
(74) *Attorney, Agent, or Firm* — Finnegan, Henderson, Farabow, Garrett & Dunner, LLP

(57) ABSTRACT

An assembled battery (10) provided by this invention has a plurality of secondary batteries (2) connected in series, and has a first bypass circuit (12) including a Zener diode (6) connected in parallel so that the connection is in the inverse direction during charging with respect to the series connections, and a second bypass circuit (14) including a varistor (4) connected in parallel to the secondary batteries (2) and the Zener diode (6). The Zener voltage of the Zener diode (6) is set to a prescribed first voltage value, and the varistor voltage of the varistor (4) is set to a second voltage value equal to or greater than the first voltage value.

4 Claims, 3 Drawing Sheets

(56) References Cited

U.S. PATENT DOCUMENTS

2006/0152196 A1    7/2006  Matsumoto et al.
2009/0289599 A1*  11/2009  White et al. .................. 320/120

FOREIGN PATENT DOCUMENTS

| | | |
|---|---|---|
| JP | 63-24850 | 2/1988 |
| JP | 63-81635 | 5/1988 |
| JP | 11-332115 | 11/1999 |
| JP | 2001-136666 | 5/2001 |
| JP | 2002-238179 | 8/2002 |
| JP | 2004-47217 | 2/2004 |
| JP | 2006-109540 | 4/2006 |
| JP | 2006-197727 | 7/2006 |

* cited by examiner

ASSEMBLED BATTERY AND ASSEMBLED BATTERY CONTROL SYSTEM

TECHNICAL FIELD

This invention relates to an assembled battery and to a control system for an assembled battery. More specifically, this invention relates to a system to control charging and discharging (particularly charging) of an assembled battery comprising a plurality of secondary batteries (cells) connected in series.

This application is a national phase application of International Application No. PCT/JP2009/063937, filed Aug. 6, 2009, and claims priority from Japanese Patent Application No. 2008-219452, filed Aug. 28, 2008, the entire contents of both of which are incorporated herein by reference.

BACKGROUND ART

Assembled batteries (also called batteries or battery packs), comprising lithium ion batteries, nickel hydrogen batteries, or other secondary batteries as unit battery cells, with a plurality of such unit battery cells connected in series, are becoming increasingly important as high-output power supplies for hybrid automobiles and mounted power supplies of other vehicles, and as power supplies for personal computers and portable communication devices. In particular, assembled batteries comprising as unit battery cells a plurality of series-connected lithium ion batteries, which are lightweight and can have high energy densities, are anticipated as favorable for use as high-output mounted power supplies for vehicles.

In a system which controls charging and discharging of this type of assembled battery, mounted on a vehicle as a power supply for motor driving, various methods are employed so that overcharging of the assembled battery does not occur during charging processing performed on the assembled battery in a predetermined time period (for example, during brake operation).

For example, in Patent Reference 1, an assembled battery control apparatus is disclosed with a configuration in which Zener diodes are connected in parallel as bypass circuits to each of the plurality of unit battery cells constituting the assembled battery. In Patent Reference 1, it is stated that application to each unit battery cell of a voltage equal to or higher than the Zener voltage of the Zener diodes can be prevented during charging of the assembled battery by a control apparatus with this configuration. Similarly, Patent Reference 2 and Patent Reference 3 also disclose assembled batteries (storage batteries) configured with Zener diodes (constant-voltage diodes) connected in parallel to each of a plurality of series connected unit battery cells.

Further, in the above-described Patent Reference 1, an assembled battery control apparatus is disclosed with a configuration in which, as an overvoltage detection circuit in addition to the above bypass circuit, second Zener diodes, with Zener voltages different from those of the first Zener diodes constituting the bypass circuit, and light-emitting diodes are connected in parallel to each of the plurality of unit battery cells constituting the assembled battery. It is stated that by means of a control apparatus of this configuration, the charging capacity can be made substantially uniform for each of the unit battery cells by the bypass circuit, and moreover unit battery cells in an overvoltage state can be displayed by the overvoltage detection circuit.

Patent Reference 1: Japanese Patent Laid-open No. H11-332115
Patent Reference 2: Japanese Patent Laid-open No. S62-221826
Patent Reference 3: Japanese Patent Laid-open No. 2002-238179

However, in a circuit configuration such as described in the above Patent References 1 to 3, in which one or two Zener diodes are connected in parallel to each of the battery cells constituting an assembled battery, when a state occurs during charging in which a high voltage exceeding a predetermined upper-limit voltage is applied to a unit battery cell for some reason, it cannot be said that consequent effects on the unit battery cell (and consequently the entire assembled battery) can be reliably prevented. In particular, in the case of an assembled battery in which unit battery cells are lithium ion batteries (and in particular nonaqueous electrolyte type lithium ion batteries), a fail-safe function, which reliably achieves prevention in advance of the occurrence of problems such as an overcharged state in which lithium is precipitated on the negative electrode, is sought.

DISCLOSURE OF THE INVENTION

This invention was created in order to solve problems of the prior art relating to control of the state of charging of such assembled batteries, and has as an object the provision of an assembled battery comprising a fail-safe function capable of reliably preventing the occurrence of adverse effects on the assembled battery (and on the unit battery cells constituting the assembled battery), even when a state occurs in which a high voltage such as causes an overcharge state is applied to a unit battery cell constituting the assembled battery during charging, as well as a system to control charging and discharging (particularly charging) of an assembled battery.

One assembled battery provided by this invention to attain the above object is an assembled battery comprising a plurality of secondary batteries, connected in series as unit battery cells, and comprises a first bypass circuit, including a Zener diode connected in parallel so that the connection is in an inverse direction during charging with respect to series connections of the plurality of secondary batteries, and a second bypass circuit including a varistor connected in parallel to the secondary batteries and the Zener diode. The assembled battery is characterized in that a Zener voltage of the Zener diode is determined such that the first bypass circuit is conducted when a first voltage value, set to a predetermined voltage value higher than a stipulated maximum charging voltage of the assembled battery (that is, the maximum allowed input voltage value during charging, determined in advance such that unit battery cells are not overcharged), is applied to the assembled battery, and moreover, a varistor voltage of the varistor is determined such that the second bypass circuit is conducted when a second voltage value set to a predetermined voltage value equal to or higher than the first voltage value is applied to the assembled battery.

In an assembled battery disclosed here, in addition to the fact that a first bypass circuit, including a Zener diode (constant-voltage diode) having a Zener voltage value set based on a predetermined first voltage value, is formed in parallel with the series connections (series circuit) of the plurality of secondary batteries (unit battery cells), a second bypass circuit, including a varistor connected in parallel with the secondary batteries and Zener diode, is also comprised as a second bypass circuit. Moreover, in an assembled battery of this configuration, the varistor voltage included in the second bypass circuit (that is, the voltage across terminals when current (for example a reference current: 1 mA) begins to flow between the varistor terminals) is set based a second voltage value, which is equal to or slightly higher than the first voltage value. That is, the first voltage $V_1$ and second voltage $V_2$, which can be ascertained as anomalous voltage values applied to the assembled battery due to some case during charging, are in the relation $V_1 \leq V_2$. Typically the relation is $V_1 < V_2$.

As a result of this configuration, by means of the assembled battery disclosed here, charging processing at a normal input charging voltage lower than the predetermined first voltage value is executed similarly to the case of a conventional assembled battery, and when a state occurs in which a voltage higher than a predetermined stipulated maximum charging voltage value, that is a high voltage equal to or higher than the first voltage $V_1$, is irregularly applied to the assembled battery for some reason, overcharging of the series-connected secondary batteries can be prevented by the flow of current in the first bypass circuit including a Zener diode the Zener voltage of which is set based on the first voltage $V_1$. Moreover, when a state occurs in which a higher voltage, that is, a voltage equal to or higher than the second voltage $V_2$, is applied to the assembled battery for some reason (typically an instantaneous overvoltage input state, such as for 1 second or less), the varistor of the second bypass circuit, the varistor voltage of which is set based on the second voltage $V_2$ in the above relation $V_1 \leq V_2$ (and preferably $V_1 < V_2$), is short-circuited, the high voltage bypasses in the second bypass circuit (that is, current flows in the second bypass circuit), and as a result, the series-connected secondary batteries can be protected from overcharging.

In a preferred mode of the assembled battery here disclosed, the plurality of secondary batteries are lithium ion batteries. In this mode, it is preferable that the Zener voltage of the Zener diode included in the first bypass circuit, and the varistor voltage of the varistor included in the second bypass circuit, be set to voltage values exceeding the sum of the stipulated maximum charging voltage values of each of the lithium ion batteries, which are in a parallel relation in the circuit configuration with the Zener diode and the varistor (for example, when 50 lithium ion batteries with a stipulated maximum charging voltage value of 4.1 V are in a parallel relation, 205 V).

When overcharging of a lithium ion battery occurs, such problems as precipitation of metallic lithium on the negative electrode side occur, which are undesirable. By means of an assembled battery of this configuration, overcharging of a lithium ion battery as a unit battery cell can be prevented, and such problems as precipitation of metallic lithium on the negative electrode can be prevented in advance.

In another preferred mode of the assembled battery here disclosed, the first bypass circuit is formed singly in parallel with the entirety of the series connections of the plurality of secondary batteries, and moreover the second bypass circuit is formed singly in parallel with the entirety of the series connections of the plurality of secondary batteries and with the first bypass circuit.

In an assembled battery with this configuration, a single first bypass circuit and a single second bypass circuit are formed in parallel with the series connections including all the secondary batteries (unit battery cells) included in the assembled battery. Hence by means of a comparatively simple configuration, the secondary batteries (unit battery cells) constituting an assembled battery can be protected from overcharging.

Further, in another preferred mode of the assembled battery here disclosed, the first bypass circuit is formed singly in parallel with the entirety of the series connections of the plurality of secondary batteries, and the second bypass circuit is formed in plurality in parallel with the plurality of secondary batteries respectively.

In an assembled battery with this configuration, a single first bypass circuit is formed in parallel with the series connections including all the secondary batteries (unit battery cells) included in the assembled battery, and second bypass circuits including varistors are formed for each of the secondary batteries (unit battery cells). By means of this configuration, when a state occurs in which a high voltage equal to or higher than the second voltage $V_2$ is applied to the assembled battery for some reason (typically an instantaneous overvoltage input state, such as for 1 second or less), as a result of formation in parallel of second bypass circuits including varistors for each of the secondary batteries (unit battery cells), varistors can be short-circuited from the positive electrode side of the series connections for each cell (that is, the charging current can be caused to circumvent each cell through the second bypass circuit). Consequently even when an overvoltage input state occurs momentarily, such as for 1 second or less, and a number of varistors are short-circuited on the positive electrode side of the series connections, the series connections of the secondary batteries remaining on the negative electrode side are maintained, and functions of the assembled battery can be caused to continue.

Further, by means of a similar technical concept, together with the assembled battery here disclosed, a control system for an assembled battery is provided. That is, a control system here disclosed is a control system for an assembled battery comprising a plurality of secondary batteries connected in series. In this system are formed a first bypass circuit, including a Zener diode connected in parallel so that the connection is in an inverse direction during charging with respect to series connections of the secondary batteries in the assembled battery, and a second bypass circuit including a varistor connected in parallel to the secondary batteries and the Zener diode. Moreover, the control system is characterized in that a Zener voltage of the Zener diode included in the first bypass circuit is determined such that the first bypass circuit is conducted when a first voltage value, set to a predetermined voltage value higher than a stipulated maximum charging voltage of the assembled battery is applied to the assembled battery, and moreover, a varistor voltage of the varistor is determined such that the second bypass circuit is conducted when a second voltage value set to a predetermined voltage value equal to or higher than the first voltage value is applied to the assembled battery.

In an assembled battery disclosed here, by providing the first bypass circuit and second bypass circuit with the above configuration, overcharging of the secondary batteries (unit battery cells) constituting the assembled battery can be effectively prevented as described above; and a similar advantageous result can be exhibited by a control system with the above configuration as well.

That is, a control system with the above configuration typically is a system (control apparatus) constructed such that, in a hybrid vehicle, electric automobile or similar vehicle, or in another power supply device, by setting an assembled battery comprising a plurality of secondary batteries connected in series in a predetermined location, the above-described first bypass circuit and second bypass circuit are formed. That is, there is the difference that a first bypass circuit and second bypass circuit of this invention are either incorporated in an assembled battery in advance, or are constructed outside an assembled battery. By means of a control system with such a configuration, advantageous results similar to those of an assembled battery of the invention as described above can be exhibited.

It is preferable that the plurality of secondary batteries included in the assembled battery be lithium ion batteries. In this mode, it is particularly preferable that the Zener voltage of the Zener diode included in the first bypass circuit, and the varistor voltage of the varistor included in the second bypass circuit, be set to voltage values exceeding the sum of the stipulated maximum charging voltage values of each of the lithium ion batteries, which are in a parallel relation in the circuit configuration with the Zener diode and the varistor. By means of an assembled battery control system with such a configuration, overcharging of lithium ion batteries mounted as unit battery cells in the assembled battery can be prevented, and lithium precipitation on the negative electrode and similar problems can be prevented in advance.

Further, in another preferred mode of the assembled battery control system here disclosed, the first bypass circuit is formed singly in parallel with the entirety of the series connections of the plurality of secondary batteries, and moreover the second bypass circuit is formed singly in parallel with the entirety of the series connections of the plurality of secondary batteries and with the first bypass circuit.

In an assembled battery control system with this configuration, a single first bypass circuit and a single second bypass circuit are formed in parallel with the series connections including all the secondary batteries (unit battery cells) included in the assembled battery. Hence by means of a comparatively simple configuration, the secondary batteries (unit battery cells) constituting an assembled battery can be protected from overcharging.

Further, in another preferred mode of the assembled battery control system here disclosed, the first bypass circuit is formed singly in parallel with the entirety of the series connections of the plurality of secondary batteries, and the second bypass circuit is formed in plurality in parallel with the plurality of secondary batteries respectively.

In an assembled battery control system with this configuration, a single first bypass circuit is formed in parallel with the series connections including all the secondary batteries (unit battery cells) included in the assembled battery, and second bypass circuits including varistors are formed for each of the secondary batteries (unit battery cells). By means of this configuration, when a state occurs in which a high voltage equal to or higher than the second voltage $V_2$ is applied to the assembled battery for some reason (typically an instantaneous overvoltage input state, such as for 1 second or less), as a result of formation in parallel of second bypass circuits including varistors for each of the secondary batteries (unit battery cells), varistors can be short-circuited from the positive electrode side of the series connections for each cell (that is, the charging current can be caused to circumvent each cell through the second bypass circuit). Consequently even when an overvoltage input state occurs momentarily, such as for 1 second or less, and a number of varistors are short-circuited on the positive electrode side of the series connections, the series connections of the secondary batteries remaining on the negative electrode side are maintained, and functions of the assembled battery can be caused to continue.

BEST MODE FOR CARRYING OUT THE INVENTION

Figure 1:
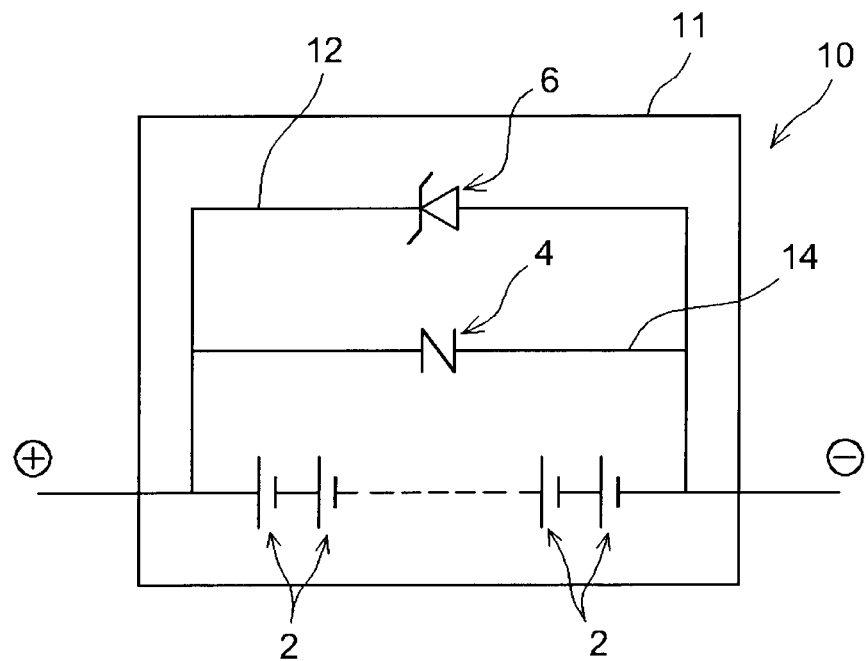
FIG. 1 is an explanatory diagram schematically showing the configuration of the assembled battery of one embodiment.

Below, preferred embodiments of the invention are explained. In this Specification, matters which are other than matters mentioned in particular (for example, a type of diode or a secondary battery composition), and which are matters necessary to implement the invention (for example, the procedure for construction of an assembled battery and control circuit, the configuration of an electrode unit and electrolyte constituting unit battery cells, or various processes for battery construction) can be understood to be design matters for persons skilled in the art, based on technology of the prior art in this field. This invention can be implemented based on the disclosed contents of this Specification and technical common knowledge of this field.

In this Specification, "unit battery cell" is a term referring to each of the batteries, that is, cells (storage elements) which can be mutually connected in series to form an assembled battery. When no limitations in particular are imposed, nonaqueous system secondary batteries and aqueous solution system secondary batteries with various compositions are included. In this Specification, a battery (cell) includes, in addition to lithium ion secondary batteries, nickel hydrogen batteries, nickel cadmium batteries, lead storage batteries, and all other chemical batteries, storage elements (physical batteries), such as electrical double-layer capacitors, used in industrial fields similarly to various chemical batteries (for example lithium ion batteries).

An assembled battery disclosed here is an assembled battery characterized in comprising a first bypass circuit and a second bypass circuit, formed in parallel with the series connections (series circuit) of a plurality of secondary batteries; no limitations are placed in particular on the type of secondary batteries (unit battery cells) constituting an assembled battery, or on the quantity or similar of unit battery cells included in an assembled battery.

Typical secondary batteries as unit battery cells constituting an assembled battery disclosed here include nonaqueous system secondary batteries, that is, lithium ion batteries comprising a nonaqueous electrolyte. A lithium ion battery is a secondary battery which can attain a high energy density and high output, and so is preferable for constructing high-performance assembled batteries and in particular assembled batteries for vehicle mounting (battery modules).

No limitations in particular are imposed on the constituent materials of lithium ion batteries used as unit battery cells constituting an assembled battery of this invention; for example, as positive electrode materials (positive electrode active materials), the $LiMn_2O_4$, $LiCoO_2$, $LiNiO_2$, and similar used in the prior art can be employed. Further, as the negative electrode materials (negative electrode active materials) of lithium ion batteries, graphite carbon, amorphous carbon, and other carbon system materials, lithium-containing transition metal oxides and transition metal nitrides, and similar can be employed. In order to attain a high voltage for an entire assembled battery, it is preferable that graphite and similar carbon system materials be used.

As for an electrolytic solution, a nonaqueous electrolyte containing an appropriate amount of an appropriate electrolyte (for example $LiPF_6$ or another lithium salt) is preferable. As a nonaqueous system solvent, for example diethyl carbonate or ethylene carbonate, or a solvent mixture of these, can preferably be used.

Technology disclosed herein can also be applied to assembled batteries employing various secondary batteries other than the above-described lithium ion batteries, as well as to charging and discharging control systems for such assembled batteries. Typical examples include nickel hydrogen batteries, nickel cadmium batteries, lead storage batteries, nickel zinc batteries, electrical double-layer capacitors, and similar.

Below, preferred embodiments of the invention are explained referring to the drawings. The assembled battery 10 shown in FIG. 1 comprises a plurality (for example, 30 to 50; however, there are omissions in the drawing, and only two batteries, at both ends, are shown; similarly in other drawings) of secondary batteries (for example, lithium ion batteries) 2, connected in series; a first bypass circuit 12, including a Zener diode 6; and a second bypass circuit 14, including a varistor 4. Typically, these constituent elements are arranged within a package 11 of the assembled battery 10. As illustrated, in this embodiment a single first bypass circuit 12 and a single second bypass circuit 14 are provided in parallel with the entirety of the series connections of the plurality of secondary batteries 2. In such a mode, the secondary batteries (unit battery cells) 2 included in the assembled battery 10 can be appropriately protected by means of the configuration of the assembled battery 10 itself.

Figure 2:
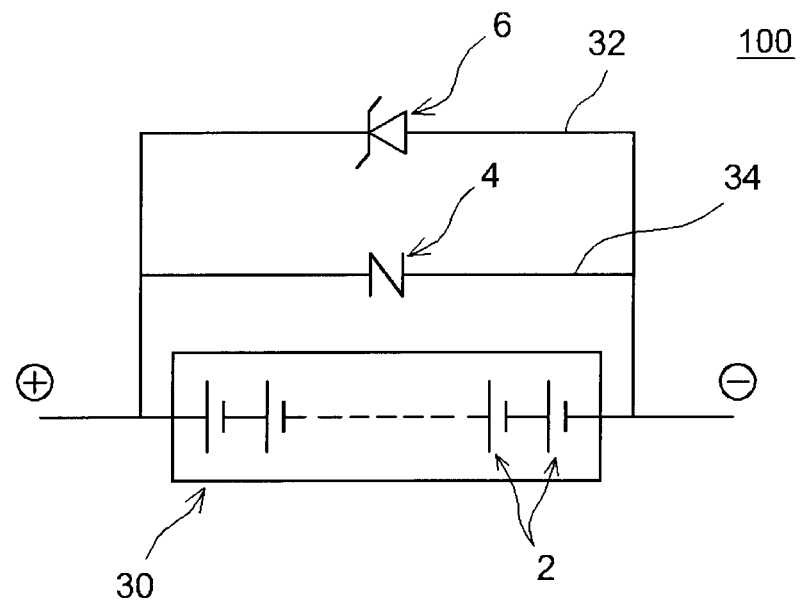
FIG. 2 is an explanatory diagram schematically showing the configuration of the control system (control apparatus) of one embodiment.

Or, as shown in FIG. 2, an assembled battery 30 can be detachably set in a predetermined position as one constituent element, and by this means a control system (control apparatus) 100 in a mode in which a first bypass circuit 32 and second bypass circuit 34 are provided outside the assembled battery 30 as electrically connected to the assembled battery 30 (that is, connected in parallel with the plurality of secondary batteries 2 series-connected within the assembled battery 30 which has been set).

FIG. 2 shows only necessary constituent elements of a control system (control apparatus) 100 characterizing this invention; in addition to what is illustrated, the control system (control apparatus) 100 can include, according to the object and application, various electronic components (capacitors, transistors, resistors, and similar) and external circuits, either directly connected or not connected to the assembled battery 30. For example, some kind of resistor may be provided in series with the Zener diode in the first bypass circuit such that the maximum rated current of the Zener diode is not exceeded.

Or, in the case of a control system provided in the power supply apparatus of a vehicle, an ammeter may be provided in the first bypass circuit and/or second bypass circuit. By means of such a configuration, the input, for some reason, of an anomalous high voltage equal to or higher than the Zener voltage or the varistor voltage, and the flowing of current in the Zener diode in the inverse direction (that is, conduction of the first bypass circuit) or the short-circuiting of the varistor (that is, conduction of the second bypass circuit) as a result, can be output as a current detection signal to a predetermined central control unit equipped in the vehicle. By this means, the central control unit can interrupt the assembled battery charging process (voltage input) itself, and can also notify an operator (driver) of the occurrence of some anomaly. Such additional control processing after conduction of the first bypass circuit and/or second bypass circuit is a design matter for a person skilled in the art capable of appropriate construction according to an object, and does not characterize this invention, and so a more detailed explanation is omitted.

The Zener voltage of the Zener diode 6 used to construct the first bypass circuits 12, 32 of the assembled battery 10 or control system 100 disclosed here can be different as appropriate according to the voltage upon complete charging and the number of the secondary batteries 2 constituting the assembled batteries 10 and 30.

For example, in the case of assembled batteries 10, 30 comprising 50 series-connected lithium ion batteries the maximum voltage at full charge (that is, stipulated maximum charging voltage) of which is stipulated as 4.1 V, and a single first bypass circuit 12, 32 is formed in parallel with the entire series connection comprising the 50 lithium ion batteries 2 as in the embodiments shown in FIG. 1 and FIG. 2, the Zener voltage value (that is, in this embodiment, equal to the above first voltage value $V_1$) can be set to a voltage value higher than 4.1×50=205 V. For example, when the secondary batteries are lithium ion batteries, a voltage value at which an overcharged state can occur, in which lithium can precipitate on the negative electrodes (typically precipitating as dendrites) in individual lithium ion batteries, can be set as the Zener voltage value (first voltage value $V_1$).

In the figures, only a symbol for a single diode is shown schematically; but in this case no limitations in particular are imposed on the number of Zener diodes 6, and in the first bypass circuits 12, 32, a plurality of Zener diodes 6 can be connected in series. For example, when using commercially marketed Zener diodes having a Zener voltage of 5.6 V, by connecting 40 to 42 of these Zener diodes in series, the voltage value for conduction of the first bypass circuit can be set to approximately 224 V to 235.2 V.

On the other hand, the varistor voltage value of the varistor 4 used to construct the second bypass circuits 14, 34 of the assembled battery 10 or control system 100 disclosed here can be appropriately different based on the number of secondary batteries 2 in a parallel relation with the second bypass circuits 14, 34, the voltage at full charge of the secondary batteries 2, and similar. For example, in the case of an assembled battery comprising 50 series-connected lithium ion batteries, the maximum voltage at full charge of which is stipulated at 4.1 V, and a single second bypass circuit (see FIG. 1 and FIG. 2) is formed in parallel with the entire series connection of 50 lithium ion batteries, and moreover when the first voltage $V_1$ is set to 224 V to 235.2 V, the varistor voltage (that is, equal to the second voltage value $V_2$ in this embodiment) can be set to a voltage value equal to or higher than the first voltage value.

From the standpoint of simplifying the circuit configuration and facilitating construction of an assembled battery or a control system, as shown in the above-described FIG. 1 and FIG. 2, it is preferable that a single first bypass circuit 12, 32 and a single second bypass circuit 14, 34 be provided, in parallel from the upstream side of the positive-electrode end of the entire series connection of secondary batteries 2 to the downstream side of the negative-electrode end.

Figure 3:
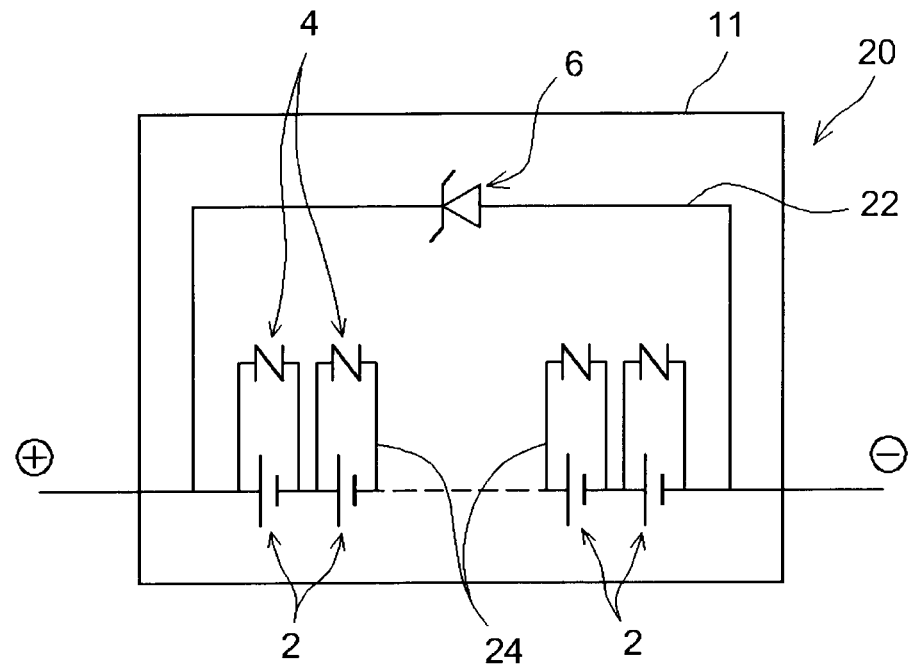
FIG. 3 is an explanatory diagram schematically showing the assembled battery of one embodiment.
Figure 4:
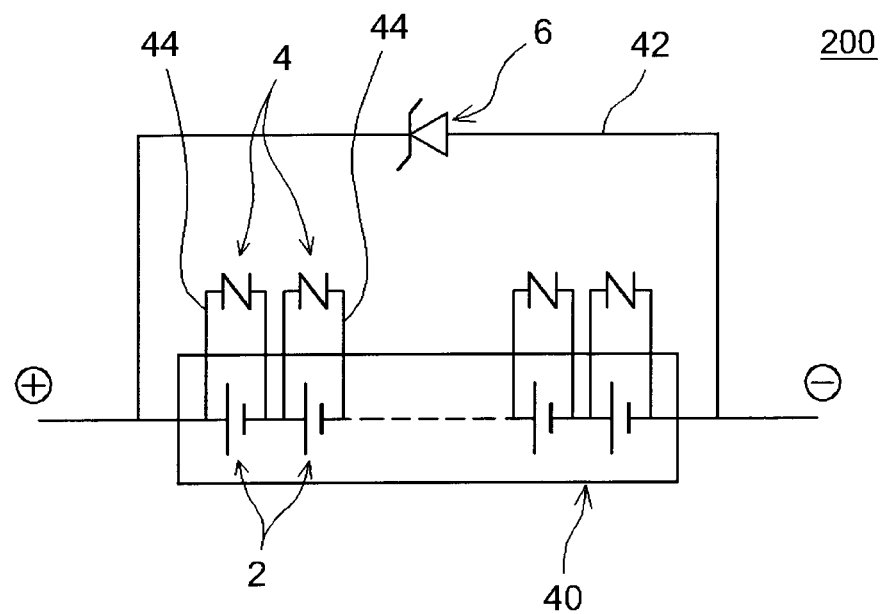
FIG. 4 is an explanatory diagram schematically showing the configuration of the control system (control apparatus) of one embodiment.

Or, as in the assembled battery 20 of a mode shown in FIG. 3 and the control system (control apparatus) 200 of a mode shown in FIG. 4, while providing a single bypass circuit 22, 42 in parallel from the upstream side of the positive-electrode end of the entire series connection of secondary batteries 2 to the downstream side of the negative-electrode end, second bypass circuits 24, 44, including varistors 4, are provided for each of the series of secondary batteries 2. By means of such a configuration, when a state occurs in which, for some reason, a high voltage equal to or higher than the second voltage $V_2$ is applied to the assembled battery 20, 40 (typically an instantaneous overvoltage input state, such as for 1 second or less), the varistors 4 can be short-circuited for each cell 2 from the positive-electrode side of the above-described series-connected secondary battery group (that is, the charging current is made to circumvent each cell 2 through the second bypass circuit 24, 44). Hence when for example a momentary overvoltage input state, such as for 1 second or less, occurs, even when a number of varistors 4 are short-circuited on the positive-electrode side of the series connections, the series connections of the remaining secondary batteries 2 on the negative-electrode side of the assembled battery 20, 40 are maintained, and functions of the assembled battery can be caused to continue.

In this case, the varistor voltage of the varistors included in each of the second bypass circuits can be set to a voltage value obtained by dividing the second voltage value by the number of second bypass circuits (in other words, the sum total of the varistor voltage values of all the varistors can become the second voltage value). For example, in a case in which a single second bypass circuit including a single varistor is formed for each of 50 series-connected lithium ion batteries with a stipulated maximum charging voltage value of 4.1 V, when the second voltage value is set to 210 V, the varistor voltage of each of the varistors can for example be set to 4.2 V.

Further, by means of a configuration as shown in FIG. 3 and FIG. 4, when there exists a cell 2 which has anomalously degraded within the assembled battery 20, 40, the possibility of occurrence of an unstable mode can be reduced. Specifically, action is as follows. That is, when during normal use a single cell within the assembled battery undergoes extreme degradation for some reason, as a change in characteristics, generally a phenomenon of rising resistance is observed. A cell in which the resistance has risen has a large voltage change during conduction, and as a result is exposed to an overcharging environment compared with the other cells constituting the assembled battery. However, by means of a configuration as shown in FIG. 3 and FIG. 4, upon reaching a predetermined voltage (for example, 4.3 V per unit battery cell), a varistor collapses due to the applied voltage, and short-circuits. Then, when the varistor short-circuits, the degraded cell enters an externally short-circuited state, and in this externally short-circuited state, the cell does not transition to an unstable mode, but enters a state in which usage is disabled. Hence the use of cells (unit battery cells) in an unstable mode is avoided, and the safety of the assembled battery can be enhanced.

In the following examples, more detailed explanations of the invention are given; however, there is no intention to limit the configuration of the invention to that of the examples.

<Manufacture of Assembled Battery>

Lithium ion batteries were manufactured as nonaqueous system secondary batteries for incorporation in assembled batteries. That is, a $LiCoO_2$ positive-electrode active material, acetylene black (AB) conduction enhancer, and polyvinylidene fluoride (PVDF) bonding agent were added to NMP (N-methyl-2-pyrrolidone), which is a dispersive solvent, in the weight ratio $LiCoO_2/AB/PVDF=85/5/10$, and by thorough mixing, a paste for formation of a positive electrode active layer was prepared. The paste for positive electrode active layer formation thus obtained was applied to aluminum leaf of length 500 mm, width 52 mm and thickness 15 μm, and roll press treatment was performed to manufacture positive electrode collector sheet, in which a positive electrode active layer was formed on the aluminum leaf.

On the other hand, a natural graphite system carbon material (graphite), which is a negative electrode active material, a styrene-butadiene copolymer (SBR) which is a bonding agent, and carboxymethyl cellulose (CMC), which is a thickening agent, were added to water, which is a dispersive solvent, in a weight ratio of graphite/SBR/CMC=95/2.5/2.5, and by thorough mixing a paste for formation of a negative electrode active layer was prepared. The paste for negative electrode active layer formation thus obtained was applied to copper leaf of length 550 mm, width 54 mm and thickness 10 μm, and roll press treatment was performed to manufacture negative electrode collector sheet, in which a negative electrode active layer was formed on the copper leaf. The amounts of paste application were adjusted such that the ratio of the positive electrode theoretical capacity to the negative electrode theoretical capacity was 1 (positive electrode):1.5 (negative electrode).

A positive electrode collector sheet and negative electrode collector sheet obtained in this way were wound (20 windings), together with separator sheets (2 sheets) which were polypropylene/polyethylene composite porous membranes of length 600 mm, width 60 mm, and thickness 25 μm, to manufacture a cylindrical shape wound electrode member for use in a lithium ion battery.

Lead terminals were welded to the positive and negative electrodes respectively of the manufactured wound electrode member, which was accommodated within an aluminum box-shape container (internal volume approximately 16 mL), of shape corresponding to the wound electrode member. An appropriate amount of electrolytic solution (a nonaqueous electrolytic solution obtained by dissolving $LiPF_6$ of concentration 1 M as a lithium salt in a solvent mixture of ethylene carbonate, ethylmethyl carbonate, and dimethyl carbonate, in a weight ratio of 1:1:1) was injected into the container, which was sealed. By this means, a sealed type lithium ion battery (secondary battery), comprising a wound type electrode member, and used as a unit battery cell of an assembled battery, was manufactured.

The assembled battery of a first example was constructed as follows. That is, 50 of the above lithium ion batteries, fully charged in advance, were connected in series, and, as shown in FIG. 1 described above, a first bypass circuit, comprising a total of 42 series-connected Zener diodes the Zener voltages of which were 5.6 V, were formed in parallel from the upstream side of the positive electrode to the downstream side of the negative electrode of the series connection of the 50 lithium ion batteries. Moreover, a second bypass circuit, including a varistor the varistor voltage of which was 235.2 V, was formed so as to be parallel with both the series connection of 50 lithium ion batteries and the first bypass circuit.

Further, the assembled battery of a second example was constructed as follows. That is, similarly to the assembled battery of the first example, 50 lithium ion batteries were connected in series, and a first bypass circuit comprising a total of 42 Zener diodes with a Zener voltage of 5.6 V were series-connected in parallel with the entirety of the series connection. Further, in the second example, as shown in FIG. 3 explained above, second bypass circuits each including a varistor with a varistor voltage of approximately 4.3 V were formed in parallel with each of the 50 lithium ion batteries.

As the assembled battery of a comparative example, an assembled battery was constructed in which only 50 lithium ion batteries were connected in series, without forming any of the above-described first bypass circuits or second bypass circuits.

Using the assembled batteries of the first example, second example, and comparative example, constructed as above, a predetermined input circuit for use in evaluation was configured. Then, charging and discharging were repeated for a fixed time period, and in a state in which the SOC was substantially 80%, charging processing was performed for a predetermined time (from approximately 1 minute to 10 minutes) at a high voltage (specifically, 245 V to 250 V for one assembled battery) exceeding the varistor voltage. Then, conduction was ended, and upon investigating the state of the lithium ion batteries, lithium precipitation on the negative-electrode side was observed in lithium ion batteries included in the assembled battery of the comparative example. On the other hand, no lithium precipitation on the negative-electrode side was found in the lithium ion batteries included in the assembled batteries of the first example and second example, which included second bypass circuits in addition to first bypass circuits.

As is clear from the above examples, by means of assembled batteries (or control systems) comprising, as a fail-safe function, a second bypass circuit including a varistor with an appropriate varistor voltage in addition to the above first bypass circuit, even when a state occurred in which an overvoltage was applied to the assembled battery during charging, the secondary batteries included in the assembled batteries were protected from overcharging, and the occurrence of problems in the secondary batteries due to overcharging (for example, lithium precipitation on the negative-electrode side in lithium ion batteries) could be prevented in advance.

In the above, preferred embodiments and examples of the invention have been explained; but these descriptions do not limit the invention, and of course various modifications are possible.

INDUSTRIAL APPLICABILITY

Figure 5:
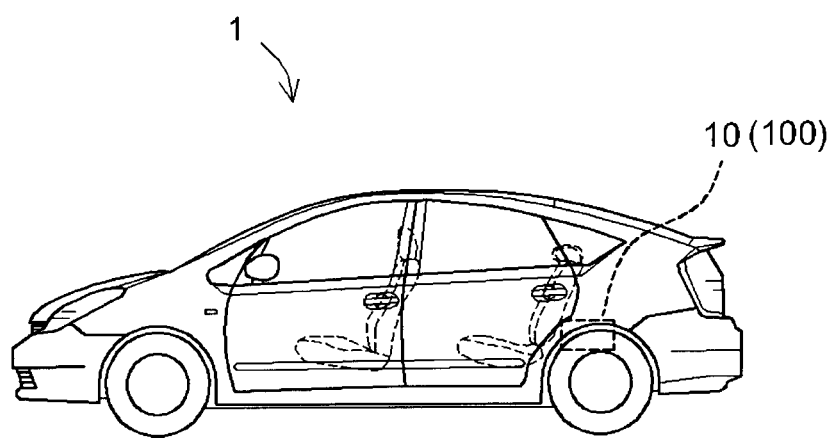
FIG. 5 is a side view schematically showing a vehicle (automobile) comprising an assembled battery of the invention.

An assembled battery (or, a control system including an assembled battery) of this invention is suitable as a motor power supply (or power supply device) mounted in an automobile or other vehicle in particular. Hence, as shown in FIG. 5, a vehicle 1 (typically an automobile; in particular, an automobile equipped with an electric motor, such as a hybrid automobile, electric automobile, or fuel cell automobile) comprising an assembled battery 10 (or control system 100) as explained above, can be provided.

The invention claimed is:

1. An assembled battery consisting of:
a series connection including a plurality of secondary batteries connected in series, the plurality of secondary batteries being lithium ion batteries, adapted for mounting on a vehicle as a power supply for motor driving and configured to be charged during a brake operation;
a first bypass circuit, including a Zener diode connected in parallel with the series connection, a positive terminal of the Zener diode being connected with a negative side of the series connection, and a negative terminal of the Zener diode being connected with a positive side of the series connection; and
a plurality of second bypass circuits each including a varistor, the plurality of varistors being connected in parallel with the zener diode and one or more of the secondary batteries,
wherein:
a Zener voltage of the Zener diode is determined such that the first bypass circuit is conducted upon a first voltage value being applied to the series connection, the first voltage value being higher than a stipulated maximum charging voltage of the assembled battery, and
a varistor voltage of the varistor in each of the second bypass circuits approximately equals a voltage value obtained by dividing a second voltage value by a number of the second bypass circuits, the second voltage value being equal to or higher than the first voltage value.

2. A vehicle, comprising the assembled battery according to claim 1.

3. The assembled battery according to claim 1, wherein the first voltage value is set to be equal to a voltage value above which lithium precipitates on negative electrodes of the lithium on batteries.

4. An assembled battery consisting of:
a series connection including a plurality of secondary batteries connected in series, the plurality of secondary batteries being lithium ion batteries, adapted for mounting on a vehicle as a power supply for motor driving and configured to be charged during a brake operation;
a first bypass circuit, including a Zener diode connected in parallel with the series connection, a positive terminal of the Zener diode being connected with a negative side of the series connection, and a negative terminal of the Zener diode being connected with a positive side of the series connection;
a plurality of second bypass circuits each including a varistor, the plurality of varistors being connected in parallel with the zener diode and one or more of the secondary batteries; and
a package,
wherein the plurality of secondary batteries, the first bypass circuit, and the second bypass circuits are arranged within the package.

* * * * *